US007397425B2

(12) United States Patent
Ranta et al.

(10) Patent No.: US 7,397,425 B2
(45) Date of Patent: Jul. 8, 2008

(54) ELECTRONICALLY STEERABLE SECTOR ANTENNA

(75) Inventors: Craig Steven Ranta, Redmond, WA (US); Qin-Ye Yin, Shaanxi (CN); Yan-Sheng Jiang, Shaanxi (CN); Wayne King, Floreat (AU)

(73) Assignee: Microsoft Corporation, Redmond, WA (US)

( * ) Notice: Subject to any disclaimer, the term of this patent is extended or adjusted under 35 U.S.C. 154(b) by 359 days.

(21) Appl. No.: 11/027,748

(22) Filed: Dec. 30, 2004

(65) Prior Publication Data

US 2006/0145921 A1 Jul. 6, 2006

(51) Int. Cl.
*H01Q 3/12* (2006.01)
*H04M 1/00* (2006.01)

(52) U.S. Cl. ..................... 342/374; 342/375; 455/562.1

(58) Field of Classification Search ......... 342/368-377; 455/562.1
See application file for complete search history.

(56) References Cited

U.S. PATENT DOCUMENTS 4,298,873 A * 11/1981 Roberts ...................... 342/375
4,521,781 A * 6/1985 Campi et al. ................ 342/372
5,303,240 A 4/1994 Borras et al.
6,281,838 B1 * 8/2001 Hong ........................ 342/374
6,292,134 B1 * 9/2001 Bondyopadhyay .......... 342/374
6,330,459 B1 * 12/2001 Crichton et al. .......... 455/562.1
6,339,712 B1 * 1/2002 Toivola ..................... 455/562.1
6,349,218 B1 * 2/2002 Nakagawa et al. ....... 455/562.1
6,522,897 B1 * 2/2003 Martek et al. ............ 455/562.1
6,661,378 B2 * 12/2003 Bloy ......................... 342/374
6,741,207 B1 * 5/2004 Allison et al. ............... 342/375
6,757,553 B1 * 6/2004 English ..................... 455/562.1
6,983,127 B1 * 1/2006 Da Torre et al. ......... 455/562.1
7,068,220 B2 * 6/2006 DeNatale et al. ............ 342/375
7,170,873 B1 1/2007 Cisar et al.
2002/0132643 A1 * 9/2002 Chang et al. ............. 455/562.1
2004/0114535 A1 6/2004 Hoffmann et al.
2005/0014533 A1 1/2005 Cave et al.
2005/0206564 A1 * 9/2005 Mao et al. ................... 342/377
2005/0242993 A1 * 11/2005 Hein .......................... 342/375
2006/0038634 A1 * 2/2006 Kirino ........................ 342/375

(Continued)

OTHER PUBLICATIONS

Application Note AP122: Microstrip transmission line structures, Polar Instruments Ltd, http://www.polarinstruments.com/support/cits/AP122.html.*

(Continued)

*Primary Examiner*—Thomas H. Tarcza
*Assistant Examiner*—Fred H. Mull
(74) *Attorney, Agent, or Firm*—Workman Nydegger

(57) ABSTRACT

An electronically steerable antenna system includes a plurality of panels that are coupled together to form an N-sided polygon. Each panel includes a plurality of microstrip conductor patches forming a phased array antenna. In a first embodiment that includes beam steering, each panel can selectively transmit or receive in a direction that is either perpendicular to the panel, or to the left or right of perpendicular, depending upon relative delay line lengths applied to the left and right antennas. A second embodiment omits the beam steering capability for each panel and simply enables only one of the N different panels to be employed for transmitting or receiving a radiofrequency signal in a direction perpendicular to the panel. PIN diodes are preferably used for selecting the panel that is active, and in the first embodiment, for selecting the delay lines used.

21 Claims, 5 Drawing Sheets

U.S. PATENT DOCUMENTS

| | | | | |
|---|---|---|---|---|
| 2006/0040709 | A1 | 2/2006 | Adachi et al. | |
| 2006/0071794 | A1 * | 4/2006 | Sayers et al. | 340/572.7 |
| 2006/0073850 | A1 | 4/2006 | Cha et al. | |
| 2006/0139833 | A1 * | 6/2006 | Ranta et al. | 361/113 |

OTHER PUBLICATIONS

Sierra Wireless and Sprint PCS Deliver New Wireless Internet Solution, http://www.sierrawireless.com/news_events/news.aspx?year=2000&contentid=6A91F6A5-7193-4923-80B7-0EC323E7A60C, Aug. 23, 2000.*

J. De Los Santos, Introduction to Microelectromechanical (MEM) Microwave Systems, Artech House, p. 167-168, 193, 1999.*

A. Jacobsen, Smart Antennas for Dummies. Telenor R&D Report, Jan. 2001.*

Office Action mailed Aug. 27, 2007, in related U.S. Appl. No. 11/045,533.

Notice of Allowance mailed Sep. 14, 2007, in related U.S. Appl. No. 11/045,687.

* cited by examiner

ELECTRONICALLY STEERABLE SECTOR ANTENNA

FIELD OF THE INVENTION

The present invention generally pertains to a multi-panel antenna that is able to selectively transmit and receive a radio frequency (RF) signal in a desired direction, and more specifically, to a multi-panel antenna that includes an electronic switching network for selectively activating one of the panel antennas to control a direction in which an RF signal is transmitted or received by the multi-panel antenna. cl BACKGROUND OF THE INVENTION As an increasing number of computer users install wireless networks that meet the Institute of Electrical and Electronics Engineers (IEEE) 802.11 specifications in their homes and workplaces, it has become apparent that the performance (i.e., range and data rate) of such systems often fails to meet their expectations. Structures built of stone or brick, or which contain blocking interior elements, such as a fireplace or metal walls, often have problems with achieving adequate RF coverage at a desired data throughput. Throughput can be very important when the signal being conveyed is a video or other multimedia signal that cannot be interrupted or delayed without noticeable adverse effects. The actual data rate that can be achieved quickly decreases as the distance between wireless communication devices and other factors reduce the received signal strength of the wireless transmissions. Since it was the first such system to be widely produced for sale to consumers, many users have installed a wireless system of the IEEE 802.11b type, which does not have the range and data rate capability of either of the more recently released IEEE 802.11a or 802.11g wireless networks.

Typically, the only way to achieve the desired coverage and throughput in an office or home is to add more access points so that the distance and intervening structural elements between the access points and the clients devices is reduced, which means higher wiring costs to run Ethernet cabling to the additional access points and greater equipment costs for each added access point. Increasing transmitter power is typically not an option due to regulatory limitations and/or because significantly increased power consumption is not acceptable for a battery powered side of a link. As an alternative to adding more access points, significant performance improvements might be achieved by providing any existing access point with the ability to focus RF energy in an appropriate direction, so that the energy is only transmitted or received in the direction required, rather than being directed or received by the more conventional omni-directional antennas used on most commercially available wireless access points and client devices.

The benefits of controlling RF energy with a directional antenna in this manner are well known. However, the direction in which the RF energy needs to be transmitted or received is not fixed in most wireless system, because a fixed access point must be able to maintain communications with moving client devices, or communicate with client devices that are located at different positions scattered around the access point. A fixed directional antenna is therefore only an acceptable solution to improve the gain of the wireless communication signal in systems where the devices communicating with each are fixed and the link between the devices is limited to the fixed direction.

Electronically and mechanically steerable antennas have been used for decades in military and industrial applications to improve the range of radio communications links and the range of radar systems. Unfortunately, these systems are typically large and very expensive, and consequently, have generally not appeared in consumer products. More recently, electronically steerable antenna technology has been used at cellular telephone network base stations to improve channel capacity and range. This technology is also beginning to appear in commercial access points intended for installation in large scale commercial applications, such as at airports or in universities, but suitable systems still cost thousands of dollars.

Clearly, a more affordable approach is needed that can provide most of the benefits of these more expensive and complex systems that have been developed for steering an antenna, but at a reasonable cost level that is acceptable for consumer products of this type. Such a product should enable selective switching of the antenna beam direction. The approach should also use conventional components and circuit traces on available printed circuit board materials. The interface to the antenna system should enable it to be controlled by a personal computer that is executing a control algorithm optimized to control the transmitting or receiving direction of RF energy by the antenna. This antenna should be capable of use with a fixed base station (i.e., an access point) of a wireless network communication link, but should also work equally well when used with a movable device (i.e., with a client device).

SUMMARY OF THE INVENTION

The present invention achieves a substantially greater signal strength when communication with another device over a wireless network (compared to a conventional omni-directional antenna), by selective steering the antenna transmitting or receiving data so that the direction in which data are communicated by the steerable antenna is generally directed toward the other device in the link. In this manner, the data rate of the channel for communicating wireless data will be substantially improved compared to a more conventional wireless network in which the RF signal is transmitted and received in all directions.

One aspect of the present invention is thus directed to a steerable antenna that is selectively controllable in regard to the direction in which the antenna is used for either transmitting or receiving an RF signal. The steerable antenna comprises a plurality of panels that are oriented generally vertically and which are mechanically coupled together along their edges, forming a polygon of N sides, where N is equal to the number of panels. Each panel is generally flat and oriented so that an outwardly facing surface of the panel faces in a substantially different direction than the outwardly facing surfaces of the other panels. Each panel includes a plurality of conductive microstrips disposed on its outer surface that serve as a directional antenna usable for either transmitting or receiving an RF signal in a direction outwardly from the panel. Also included is a panel selector switch circuit that is controllable in response to a selector signal to selectively activate one of the plurality of panels for either receiving or transmitting an RF signal. The panel selector switch circuit is coupled to an antenna terminal on each panel and preferably includes a plurality of positive-intrinsic-negative (PIN) diode switches.

Each panel includes a conductive plate covering a substantial portion of an inwardly facing surface of the panel. This conductive plate is adapted to couple to an earth ground connection. In a preferred embodiment, each panel comprises a printed circuit board, and the conductive microstrips comprise conductive traces on the printed circuit board.

Each panel further includes a plurality of discrete patches of the conductive microstrips, and the discrete patches on the panel operate as a phased array antenna. One embodiment of the present invention also includes a plurality of delay circuits. Each delay circuit is selectively coupled to a different one of the plurality of discrete patches. A delay switch circuit is selectively controllable to determine which of the plurality of selective delay circuits is coupled to the antenna terminal on the panel, to provide a desired delay, thereby controlling a direction in which an RF signal is transmitted or received by the phased array antenna on the panel. The delay switch circuit also preferably includes a plurality of PIN diode switches.

It is contemplated that this steerable antenna can readily be adopted for use at different operating frequencies. Accordingly, in an initial application of a preferred embodiment, the plurality of panels and each of the plurality of patches on each panel are sized for transmitting and receiving signals at radio frequencies designated for communicating data over a wireless computing network.

In one exemplary preferred embodiment, the plurality of discrete patches on each panel comprises a left panel antenna, a center panel antenna, and a right panel antenna. On the panel that is selected by the panel selector switch circuit as active for transmitting or receiving an RF signal, three conditions control the direction in which the panel radiates or received the RF signal. If the delay selector switch circuit selects a relatively longer delay for the left panel antenna and a relatively shorter delay for the right panel antenna, compared to the delay for the center panel antenna, the RF signal that is transmitted or received by the panel is steered to the left of a perpendicular to the panel. Conversely, if the delay selector switch circuit selects a relatively longer delay for the right panel antenna and a relatively shorter delay for the left panel antenna, compared to the delay for the center panel antenna, the RF signal that is transmitted or received by the panel is steered to the right of the perpendicular to the panel. Finally, if the delay selector switch circuit selects a common delay for the right panel antenna, the left panel antenna, and the center panel antenna, the direction of the RF signal that is transmitted or received by the panel is substantially perpendicular to the panel. The panel selector switch circuit is preferably controlled in response to a logic level panel selector signal, while the delay selector switch circuit is preferably controlled in response to a logic level directional selector signal.

Another aspect of the present invention is directed to a method for controlling the direction in which a steerable antenna is used for transmitting or receiving an RF signal. The method includes the step of first determining a preferred direction in which the RF signal is to be transmitted or received. One of a plurality of generally planar antenna panels that face in substantially different directions is then selected for use in transmitting or receiving the RF signal and the panel is selected that most closely faces in the desired direction. Alternatively in a high multi-path environment, the panel having the highest received signal strength may be selected. Each panel has an outer surface with a plurality of conductive microstrips that form a phased array antenna on the panel and are employed both for radiating an RF signal generally outwardly and away from the outer surface or receiving an RF signal that is directed toward the outer surface of the panel. Other steps of the method are generally consistent with the functions performed by the elements of the steerable antenna discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
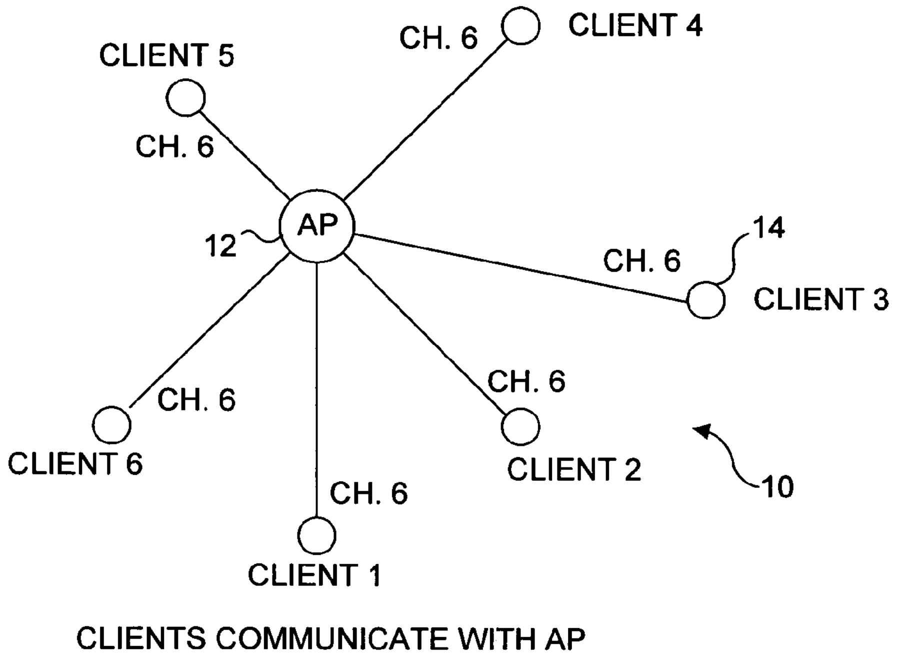
FIG. 1A (PRIOR ART)
FIG. 1A (Prior Art) is a schematic diagram illustrating a generally conventional wireless network in which client devices are communicating with a central access point.

As briefly discussed above, in the Background of the Invention, conventional wireless networks often experience significant problems in providing acceptable signal strength and data rate. A typical wireless network 10 is illustrated in FIG. 1A (Prior Art). In this wireless network, an access point 12 is coupled to a plurality of client devices 14 and communicates bidirectionally with the client devices using transceivers conforming to the IEEE 802.11(a, b, or g) specifications. As is often the case, client devices 14 are distributed around access point 12 in various positions and at various distances. Indeed, client devices are often mobile and therefore, their position may frequently change in regard to access point 12. For this reason, most client devices and access points are provided with one or more omni-directional antennas (not shown in this Figure) to ensure that the RF signal being propagated between the client devices and the access point is receivable from any direction. While the lack of directionality solves the problem of ensuring that the access point can communicate with client devices that are distributed at different points around it and which may change position, the use of omni-directional antennas also substantially reduces the efficiency with which RF signals are propagated between each client device and the access point. This problem can be particularly troublesome when multimedia data, such as video data, are being communicated from the access point to the client device, since a relatively low data rate will produce an unacceptable result when they multimedia signal is played by the client device.

Figure 1B:
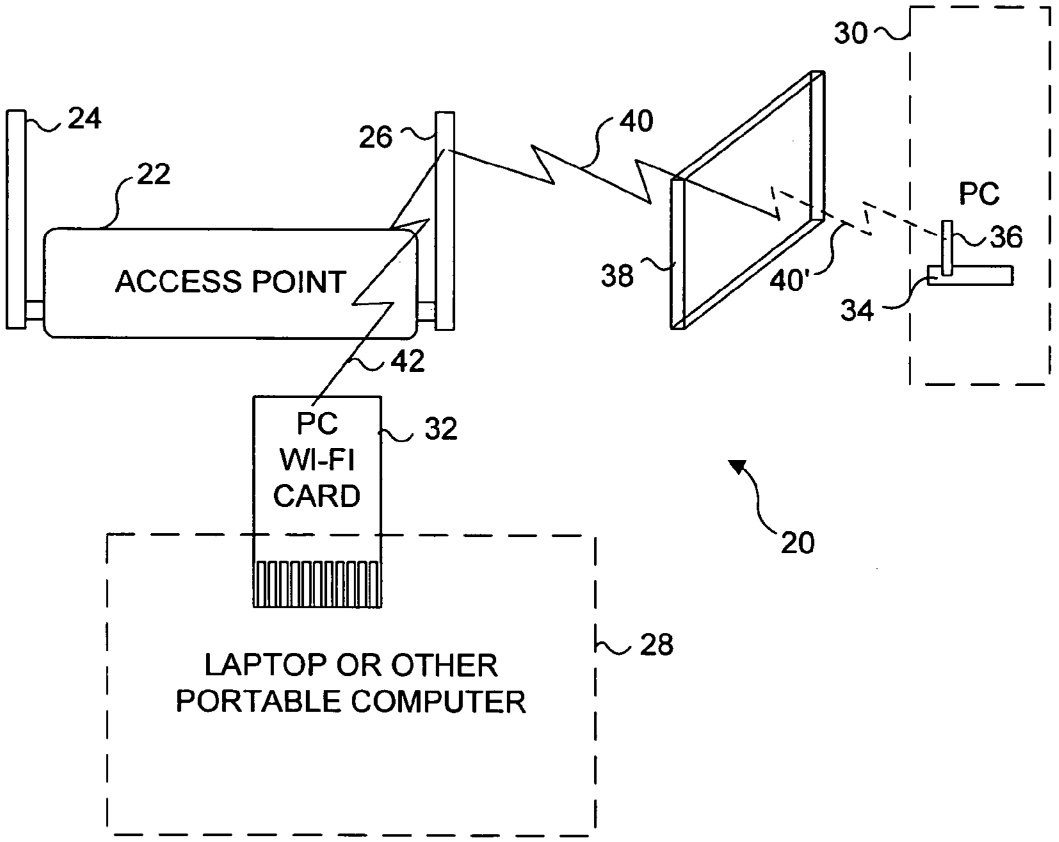
FIG. 1B (PRIOR ART)
FIG. 1B (Prior Art) is a schematic block diagram illustrating wireless communication between an access point, a laptop client device, and a personal computer (PC) client device, illustrating how wireless RF signals can be adversely effected by intervening structures.

In FIG. 1B (Prior Art), another problem with prior art antenna systems is illustrated. A simple wireless network 20 includes an access point 22 that has two omni-directional antennas 24 and 26. This access point communicates with a laptop 28, as well as a PC 30. A PC WiFi card 32 is included in laptop 28 and includes one or more internal antennas (not shown), while PC 30 includes a Peripheral Component Interconnect (PCI) bus WiFi card 34 that also has an omni-directional antenna 36. PC 30 typically remains fixed at one location, while a laptop 28 is able to move about access point 22. One or more structural elements such as a metal reinforced wall 38 is disposed between access point 22 and PC 30, i.e., between omni-directional antennas 26 and 36. One or more such structural elements substantially reduce the signal strength of wireless communications between the access point and the client device at PC 30. For example, a signal strength of an RF signal 40 is thus substantially reduced in RF signal 40' after the signal has propagating through wall 38 and as a result, PC 30 will likely have a substantially lower data rate for wireless communications between it and the access point, compared to the wireless communications between PC WiFi card 32 on laptop 28 and the access point.

Access point 22 includes two omni-directional antennas 24 and 26 to make use of diversity antenna circuitry in the access point, which selects the antenna employed during wireless communication. However, the diversity switching circuit includes two omni-directional antennas, and does not choose an antenna based upon a direction in which the antenna will transmit or receive an RF signal. The use of an omni-directional antenna with a wireless transceiver means that a substantial portion of the RF signal that is propagated from the antenna will be in directions where no client devices are located, thereby wasting the energy of the signal. Although access point 22 could use a directional antenna aimed toward PC 30 for improving communications with it, the signal propagated by such an antenna will be in the wrong direction to reach laptop 28, unless the laptop is located along the line running through the access point and the PC. Accordingly, the prior art teaches that it is only acceptable to use directional antennas if the intended transmission and reception is only in the direction favored by the directional antenna.

There is another circumstance in which the choice of a direction in which to transmit or receive an RF signal can improve the quality of the communication link. Specifically, in a high multi-path environment, the best antenna direction for the receiving antenna is not always pointing toward the transmitter. For example, the RF signal from the transmitter in one direction could be reflected from a foil covered insulation in an exterior wall, which might cause the strongest received signal direction to be oriented away from the line of sight direction toward the transmitter. The present invention also is very useful in these situations, which often occur in an indoor environment, since it provides the ability to steer an antenna in a direction to achieve the best signal strength, even if the direction is not in the line of sight between two wireless devices.

First Exemplary Preferred Embodiment of Steerable Antenna System

Figure 2:
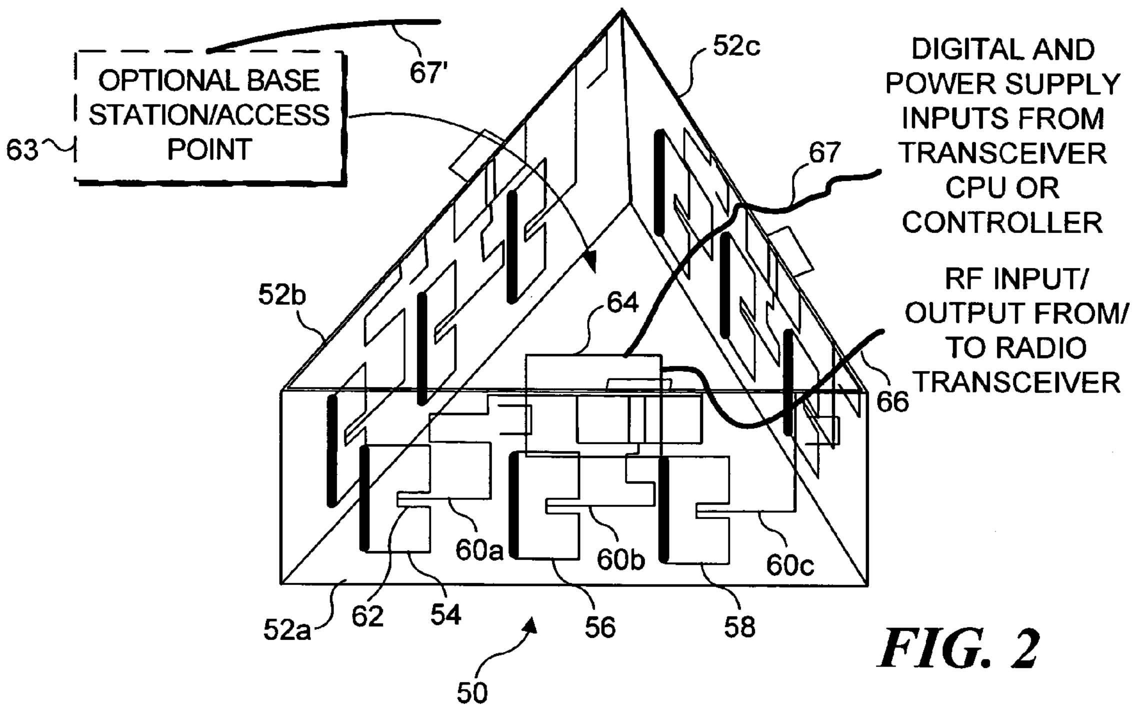
FIG. 2 is an isometric view of a first embodiment of a steerable antenna in accord with the present invention.

A first embodiment of an exemplary steerable antenna system 50 in accord with the present invention is illustrated in FIG. 2. Steerable antenna system 50 includes three relatively planar panels 52*a*, 52*b*, and 52*c* that are joined at their ends, forming an equilateral triangular-shaped polygon. While this exemplary embodiment only includes three such panels, it is contemplated that N panels might be joined to form a polygon having N sides, where N can be greater than three. Each panel is substantially identical to the others. Accordingly, only the elements on panel 52*a* are discussed herein. Panel 50*a* includes three microstrip conductor antennas 54, 56, and 58 that are spaced apart from each other, forming a phased array antenna on the panel. These microstrip conductor antennas are formed as a patch of copper microstrip traces on the printed circuit board comprising panel 52*a*. Suitable laminate materials for the panels must have dielectric and other characteristics appropriate for use at frequencies of 2.4 GHz and above in this application, and it was determined that laminate boards such as the CuClad 217™ from Arlon Electronic Substrate Division of Holders Technology Corporation, and the N9000-13RF™ from Park/Nelco Electrochemical Corporation were acceptable for this purpose. Much of the inwardly facing surface of each of these three panels is covered with a copper layer (not shown for purposes of clarity) that is connected to an earth ground.

When viewed looking outwardly from the outer facing surface of the panel, microstrip conductor antenna 54 is located toward the right end of panel 52*a* and microstrip conductor antenna 58 is located toward the left end of the panel. Thus microstrip conductor antenna 54 is also referred to herein as the "right antenna" on the panel, microstrip conductor antenna 58 is also referred to herein as the "left antenna" on the panel, and microstrip conductor antenna 56 is also referred to as the "center antenna." The left and right antennas on each panel can each be selectively connected to one of three different length delay lines (which are not shown in FIG. 2, but are discussed in greater detail below in regard to FIGS. 2 and 6). The delay line circuitry is respectively coupled to microstrip conductor antenna 54, 56, and 58 through printed circuit traces 60*a*, 60*b*, and 60*e*, which are routed on the panel to ensure that they are of equal length. An impedance matching notch 62 is formed in each of the three microstrip conductor antennas, where joined to these printed circuit traces of each antenna.

Figure 3:
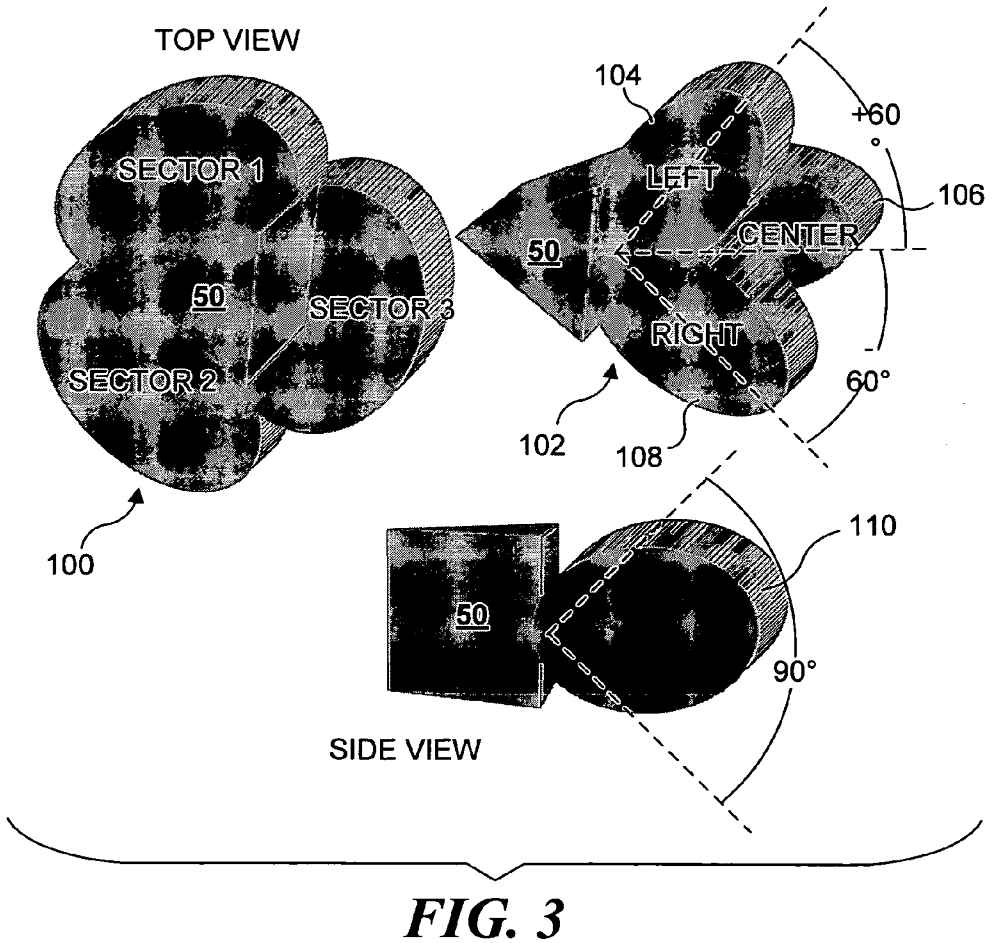
FIG. 3 is a schematic view graphically illustrating the antenna beam patterns for the first embodiment of the present invention, including a top view showing all three sectors around the steerable antenna, a top view showing the beam directed can be steered for one panel of the steerable antenna, and a side view of the beam pattern for one panel.

Antenna system 50 includes three panels and is thus able to transmit and receive RF signals in three sectors, as shown by a graphic illustration 100 in FIG. 3. However, only one of panels 52*a*, 52*b*, and 52*c* is active at a time. A 3:1 RF switch 64 (FIG. 2) operates in response to a panel selection signal, to select one of the three panels as active for transmitting or receiving an RF signal at any time. 3:1 switch 64 is coupled to a radio transceiver (not shown) by a cable 66, which conveys the RF signal to and from steerable antenna system 50. A control cable 67 conveys the digital logic level signals for panel selection and direction selection, as well as the required DC power supply voltages and grounds. The panel that is selected as active can be employed either for transmitting or receiving an RF signal within the sector associated with the panel. Each of the three sectors covers about 120° of arc, and together, all three sectors cover the full 360° around steerable antenna system 50. More importantly, however, in this first embodiment, each panel is able to selectively transmit or receive in one of three different directions (or beams) that together encompass the sector associated with the panel. The direction in which a panel transmits or receives in this sector depends upon the delay lines that are used for the left and right antennas on the panel relative to the center antenna. The center antenna on the panel is the reference phase, and the outer two antennas can either be fed through a delay line that is shorter, longer, or equal to the phase delay of the reference center antenna When the antenna on the left is coupled with the long delay and the antenna on the right with a short delay, the beam is steered to the left of a perpendicular to the panel. Conversely, when the antenna on the right is coupled with a long delay and the antenna on the left with the short delay, the beam is steered to the right of the perpendicular. When a common delay is used for all three antennas comprising the phased array on the panel, the beam is directed generally perpendicular to the panel.

Optionally, a base station/access point 63 can be included with steerable antenna system 50 so that cable 66 would directly connect to the base station/access point, which might be disposed in the center of the steerable antenna system. A control cable 67' extends from optional base station/access point 63 to receive power supply and digital control signals from an external CPU or controller (not shown). By including base station/access point 63 within the center of the steerable antenna system, the total footprint of the wireless device and its steerable antenna system can be reduced, compared to using the steerable antenna system with a separate base station/access point.

A graphic illustration 102 in FIG. 3 illustrates a left lobe 104 a center lobe 106, and a right lobe 108 corresponding to the beam direction in which the three antennas comprising the phased array on this panel can be selectively steered. From this illustration, it will be apparent that each lobe forms a beam width of about 40° horizontal and, as shown for a lobe 110, about 90° vertical. The beam for each panel can thus be steered to a position that is about 60° from normal, or −60° from normal to the outer surface of the panel (i.e., in the directions corresponding to lobes 104 and 108), or can be steered substantially normal to the surface (in a direction corresponding to lobe 106). Since steerable antenna system 50 has three such panels, the beam it produces can be selectively steered in one of nine different directions around the full 360° of arc surrounding the steerable antenna system. The beam steering for each panel is accomplished by selecting the length of delay lines used in such a way as to advance or retard the RF carrier phase relative to the center antenna on the panel. It should be noted that the delay times may be selected at design time to obtain any desired steering angles.

Figure 4:
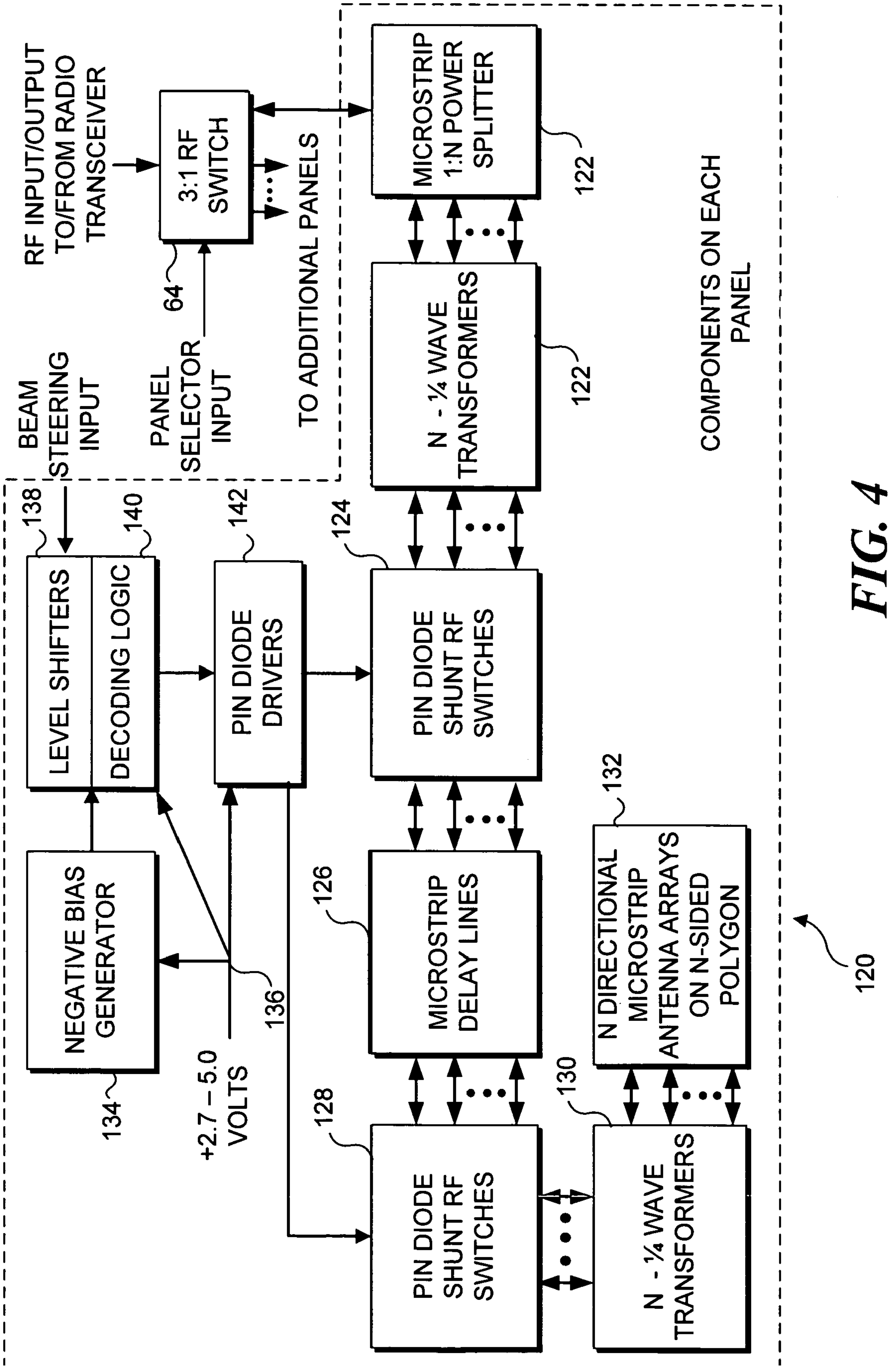
FIG. 4 is a schematic block diagram of the electronic components comprising one panel of the first embodiment of the present invention.
Figure 5:
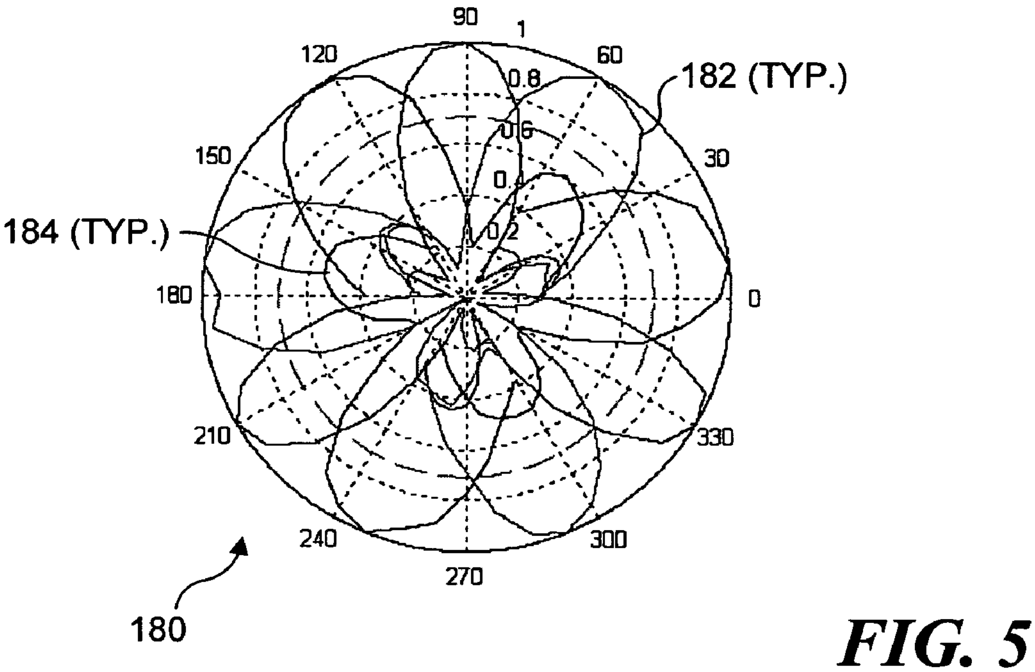
FIG. 5 is a composite empirically measured signal strength pattern for all nine steered beams of the first embodiment of the present invention.
Figure 6:
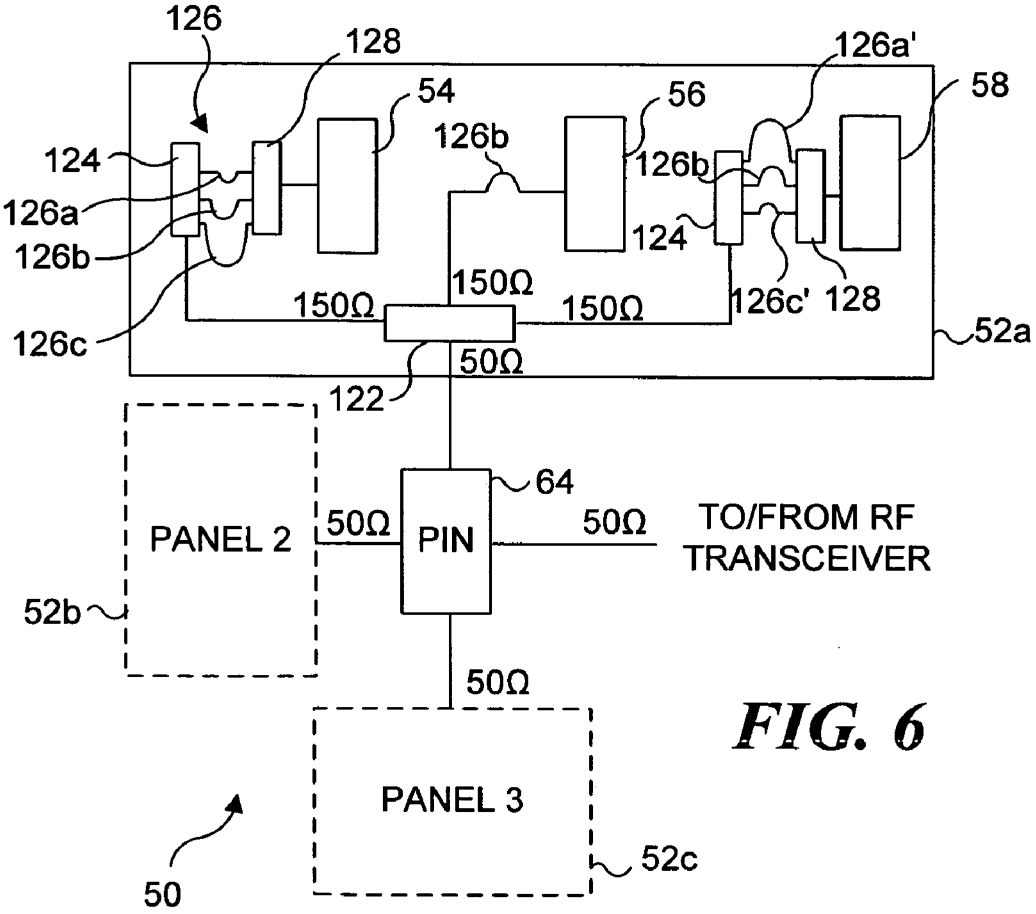
FIG. 6 is a schematic block diagram of the electronic components of the first embodiment of the present invention.

Referring now to FIGS. 4 and 6, further details of the steerable antenna system are illustrated. In FIG. 4, a schematic block diagram 120 illustrates the components on a single panel (enclosed within the dash line). Again, the same components are included on each panel and need not be separately shown. From 3:1 RF switch 64, the radio signal is conveyed to or from the panel selected in response to the panel selector input. A microstrip 1:N power splitter 122 splits the RF signal being transmitted or received relative to N−¼ wave transformers 122, which are coupled to PIN diode shunt RF switches 124. It should be noted that the power splitter design can be used to match the impedance of the RF input from the 3:1 RF switch to the impedance of the ¼ wave transformers and subsequent antenna elements, which may be different. In the preferred embodiment the power splitter input impedance is 50 ohms and each of the three microstrip element branch impedances is 150 ohms. These switches and PIN diode shunt RF switches 128 determine which of the microstrip delay lines 126 will be used for steering the phased array antennas on the panel in one of the three different directions, as discussed above. Another set of N−¼ wave transformers 130 couples PIN diode shunt RF switches 128 to the N directional microstrip antennas comprising the phased array, as indicated in a block 132.

As an alternative, it is contemplated that the sets of delay lines for the left antenna and the right antenna for any selected panel might be provided upstream of the PIN diode switch that chooses the active panel. This approach would thus require only one set of selectable delay lines for a right antenna and one set of delay lines for a left antenna, as well as the PIN switches to select the specific delay lines used for the left and right antennas on the panel selected as active, rather than providing one set of delay lines for each of the right antenna and the left antenna, as well as the PIN switches on each panel. This approach would save parts, but might be more difficult to implement because of potential problems in controlling the phase as a result of variations in the length of conductors, and because the number of RF connections to each panel would triple. However, it might be possible to control the conductor lengths that can affect phase relationships by using a flexible MYLAR™ substrate for the conductors.

A negative bias generator 134 receives a direct current (DC) voltage level of from about 2.7 to 5.0 volts on a line 136 and produces a negative bias, since the circuitry requires both positive and negative voltage level rails relative to a zero level. The output of negative bias generator 134 is applied to a level shifter's 138 and a decoding logic 140, which receive a digital logic beam steering input to determine in which of the three directions from the active panel the beam will be steered. The output of decoding logic 140 is applied to PIN diode drivers 142, which drive PIN diode shunt RF switches 124 and 128, thereby determining along which of the three directions of the beam the panel will transmit or receive. It should be appreciated that some types of PIN diodes may not require the negative bias generator to achieve the desired performance, in which case this block and its functionality can be eliminated.

FIG. 6 shows still further details for panel 52*a*. Microstrip delay lines 126 that are used for the right antenna include a relatively shorter delay line 126*a* and a relatively longer delay line 126*c*, compared to a reference delay line 126*b*. For the left antenna, a relatively longer delay line 126*a'* and a relatively shorter delay line 126*c'* are employed. Thus, delay line 126*a* and 126*a'* would be selected by the PIN diode drivers for the right and left antennas, respectively, to steer the beam toward the left of perpendicular, since the left antenna would then be driven with a longer delay, compared to the right antenna. Conversely, to steer the beam toward the right of perpendicular, delay lines 126*c* and 126*c'* would be chosen for the right and left antennas, respectively. Delay line 126*b* would be selected for all three antennas on the panel to direct the beam generally perpendicular to the surface of the panel.

The efficacy of the present invention has been shown by tests made of a prototype model, as illustrated by the transmitted signal strengths on a polar coordinate graph 180. This graph illustrates a plurality of different primary lobes 182 that are spaced apart from each other by approximately 40°. Although all nine primary lobes are illustrated, perhaps giving the impression that they occur simultaneously, each of these lobes is separately obtained at a different time, when the steerable antenna system is selectively driven to transmit only in the direction of that lobe. Also shown are the signal strengths of secondary side lobes 184. From this graph, it will be apparent that the steerable antenna system achieves its goal of selectively determining a beam direction for transmission or reception of an RF signal.

Figure 8:
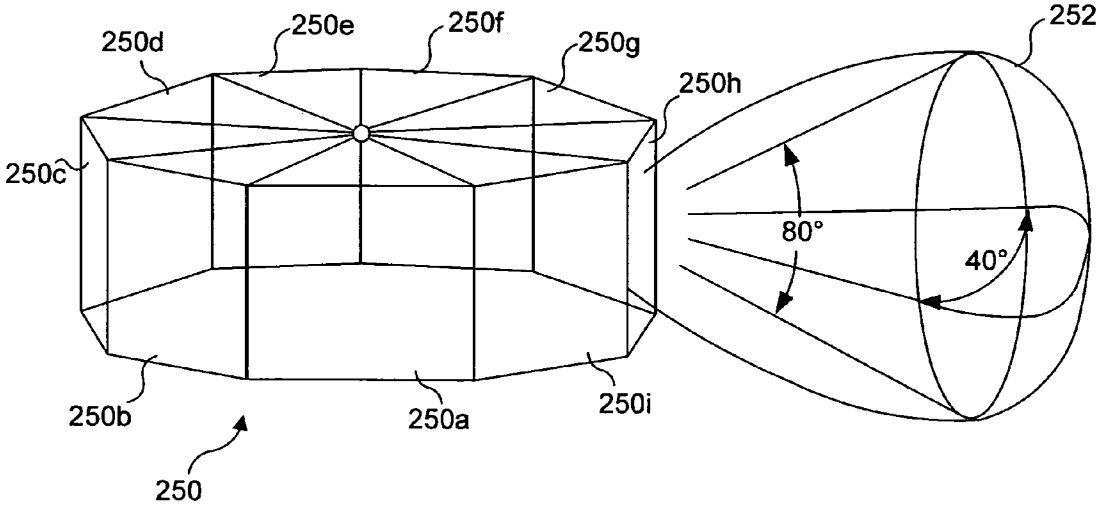
FIG. 8 is an isometric view of the second embodiment of the present invention, showing the theoretical beam pattern for one of the panels.

A second embodiment of a steerable antenna system 250 is illustrated in FIG. 8. Unlike steerable antenna system 50, steerable antenna system 250 does not have the capability for steering a beam in one of three different directions, for each panel. Instead, the phased array of antennas comprising patches of microstrip conductors on each panel always employs the same length delay lines. This second embodiment is substantially larger than the first, since it includes nine panels 250*a* through 250*i* having their ends coupled together to form a polygon with nine sides. Since the phased array antennas on each panel are always driven with the same delay, as illustrated by a graphical lobe 252, the beam produced by each panel is always generally perpendicular to the outer surface or face of the panel. The beam width extends approximately 40° in the horizontal and about 80° in the vertical direction.

Although nine panels are used in this exemplary second embodiment of the steerable antenna system, it is contemplated that either fewer or more panels could instead be used, so that the embodiment is more generally described as comprising N different panels, each of which is configured to employ the phased antenna array on the panel to define a beam that is directed generally perpendicular to the panel.

Figure 7:
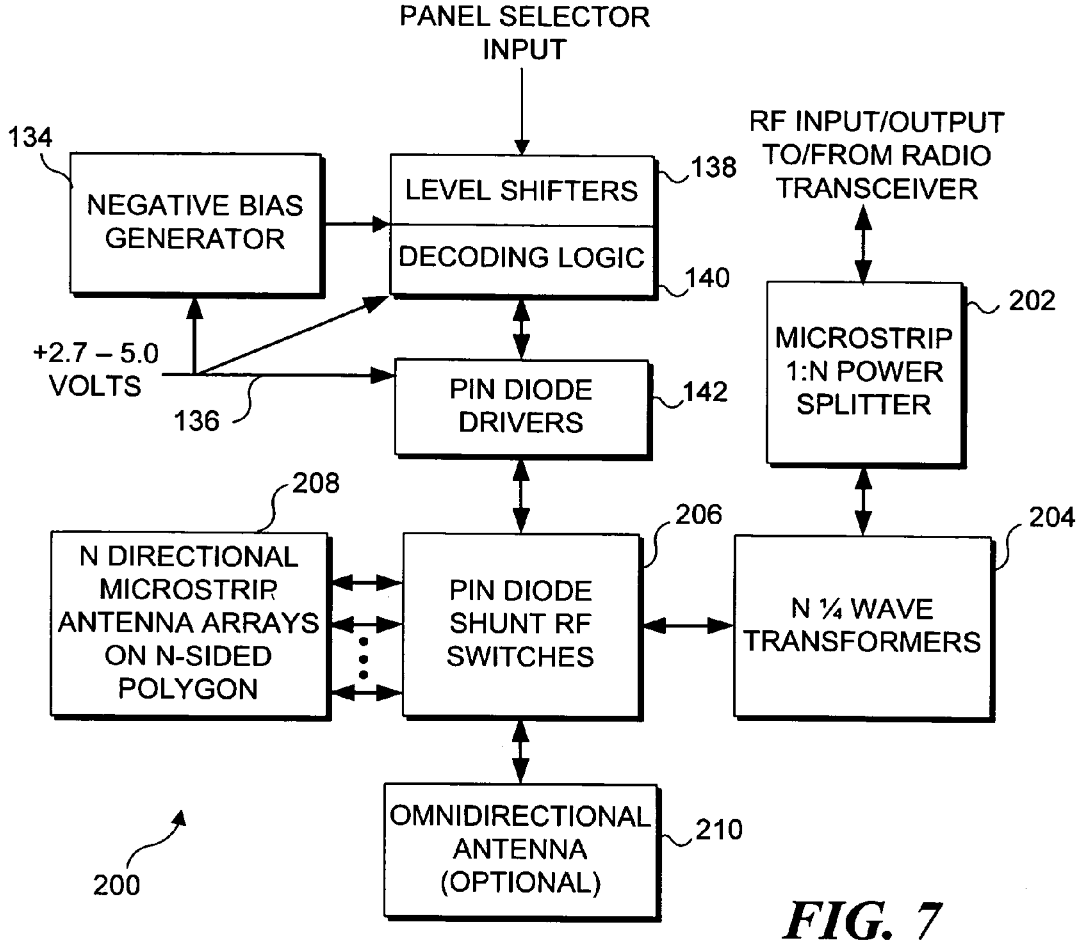
FIG. 7 is a schematic block diagram of the electronic components of one panel of a second embodiment of the present invention.

FIG. 7 illustrates a schematic block diagram 200 for steerable antenna system 250. This block diagram includes a number of elements common to the first embodiment shown in FIG. 4. However, in FIG. 7, a microstrip 1:N power splitter 202 is used to split the signal to and from the radio transceiver in regard to N−¼ wave transformers 204. These transformers are coupled to PIN diode shunt RF switches 206. These switches determine the specific one of the N directional microstrip antenna arrays or panels on the N-sided polygon that will be activated for transmitting or receiving the RF signal. Level shifters 138 receive a panel selector input, which decoding logic 140 decodes to control PIN diode drivers 142. These drivers determine the state of PIN diode shunt RF switches 206, thereby selectively activating only one of the panels at a time.

Optionally, an omni-directional antenna 210 can be included to receive a signal from another wireless device that is currently attempting to communicate, for use in determining the direction of that signal so that the appropriate panel can be activated to communicate with the other device. The logic employed in determining which panel is activated and in which direction the first embodiment beam is steered is not disclosed herein, since it is not part of the present invention. Although steered antenna system 250 is mechanically more complex and requires more printed circuit panels and more physical space, it is electronically simpler because it does not include the beam steering function. The second embodiment, steerable antenna system 250, is more suitable for higher frequencies (i.e., above 2.4 GHz) where the physical size of the antenna array is a concern. The first embodiment, steerable antenna system 50, is more suitable for use at frequencies of up to 2.4 GHz.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A steerable antenna that is selectively controllable in regard to a direction in which the antenna is usable for transmitting or receiving a radio frequency (RF) signal, comprising:

(a) a plurality of panels that are coupled together along edges of the panels, each panel being substantially flat and oriented so that an outwardly facing surface of the panel faces in a substantially different direction from outwardly facing surfaces of other of the plurality of panels, each panel including a plurality of discrete microstrip antennas that comprise a phased array antenna including a left panel antenna, a center panel antenna, and a right panel antenna for transmitting an RF signal in a direction outwardly from the face of the panel;

(b) an omni-directional antenna configured to receive an indication from a destination device that the signal is greatest when the signal is transmitted to a determined position;

(c) a panel selector switch circuit that is controllable in response to a selector signal to selectively activate one of the plurality of panels for transmitting an RF signal, the panel selector switch circuit being coupled to an antenna terminal on each panel;

(d) a signal splitter configured to split the RF signal into separate first, second, and third instances of the RF signal; and (e) a delay selector switch circuit configured to electronically steer the focus of the phased array antenna in the direction of the strongest detected signal strength according to the indication received by the omni-directional antenna, the first instance of the RF signal being routed through a longer delay that is longer than a reference delay, the second instance of the RF signal being routed through the reference delay, the third instance of the RF signal being routed through a shorter delay that is shorter than the reference delay, each of the first, second, and third instances of the RF signal being routed simultaneously through the corresponding longer, reference, and shorter delays, respectively, such that, as a result of the different delays, each of the first, second and third instances of the RF signal is transmitted at a different time from a different panel antenna, but each of the first, second, and third instances of the RF signal arrive at the destination device at substantially the same time, thereby strengthening the transmitted signal.

2. The steerable antenna of claim 1, wherein the plurality of panels are oriented substantially vertically and form an N-sided polygon, where N is equal to the number of panels in the plurality of panels.

3. The steerable antenna of claim 1, wherein the panel selector switch circuit includes a plurality of positive-intrinsic-negative (PIN) diode switches.

4. The steerable antenna of claim 1, further comprising:

(a) a plurality of delay circuits, each of which is selectively coupled to a different one of the plurality of discrete microstrip antennas; and (b) a delay switch circuit that is selectively controllable to determine which of the plurality of selective delay circuits that provide a desired delay is selected, thereby controlling a direction in which an RF signal is transmitted by the phased array antenna on the panel.

5. The steerable antenna of claim 1, wherein each panel comprises a printed circuit board on which the discrete microstrip antennas that comprise a phased array antenna are formed as conductive traces.

6. The steerable antenna of claim 1, wherein the plurality of panels and each of the plurality of discrete microstrip antennas are sized for transmitting and receiving signals at radio frequencies used for communicating data over a wireless computing network.

7. The steerable antenna of claim 1, wherein the panel selector switch circuit is controlled in response to a logic level panel selector signal as a function of a desired direction for transmitting an RF signal.

8. The steerable antenna of claim 1, wherein the delay selector switch circuit is controlled in response to a logic level directional selector signal as a function of a desired direction for transmitting an RF signal.

9. The steerable antenna of claim 1, further comprising:

receiving a second indication at the omni-directional antenna from the destination device that the signal strength is greater when the signal is transmitted to a second, different position, the position being determined by the omni-directional antenna; and automatically steering the focus of the phased array antenna to the determined second position based on the received second indication.

10. The steerable antenna of claim 1, wherein each of the plurality of panels comprises a printed circuit board.

11. A method for controlling a direction in which a steerable antenna is used for transmitting a radio frequency (RF) signal, comprising the steps of:

(a) receiving an indication from a destination device that a transmission signal transmitted by the steerable antenna is greatest when the signal is transmitted to a determined position;

(b) selectively activating one of a plurality of substantially planar antenna panels that comprise the steerable antenna, wherein the planar antenna panels face in substantially different directions, each panel including a plurality of discrete microstrip antennas that comprise a phased array antenna including a left panel antenna, a center panel antenna, and a right panel antenna and which are used for one of radiating an RF signal generally outwardly from the outer surface and receiving an RF signal that is directed toward the outer surface of the panel, so that a specific panel of the plurality of panels that faces generally in the preferred direction is selectively activated to transmit the RF signal;

(c) splitting the RF signal into separate first, second and third instances of the RF signal; and (d) steering the focus of the phased array antenna using a delay selector switch in the direction of the strongest detected signal strength according to the indication received by the omni-directional antenna, the first instance of the RF signal being routed through longer delay that is longer than a reference delay, the second instance of the RF signal being routed through the reference delay, the third instance of the RF signal being routed through a shorter delay that is shorter than the reference delay, each of the first, second, and third instances of the RF signal being routed simultaneously through the corresponding longer, reference, and shorter delays, respectively, such that, as a result of the different delays, each of the first, second and third instances of the RF signal is transmitted at a different time from a different panel antenna, but each of the first, second, and third instances of the RF signal arrive at the destination device at substantially the same time, thereby strengthening the transmitted signal.

12. The method of claim 11, further comprising the step of selectively steering the radio signal that is transmitted, for the panel that was activated, so that a direction in which the radio signal is transmitted more closely matches the preferred direction.

13. The method of claim 12, wherein the step of determining the preferred direction for transmitting the RF signal comprises the step of selecting the direction to ensure that substantially a best signal strength for the RF signal that is received, to enable the direction to be controlled in a high multi-path environment where the RF signal that is received may have been reflected from one or more surfaces.

14. The method of claim 11, wherein the step of selectively activating comprises the step of responding to a panel select signal indicating the panel that should be activated to transmit the RF signal in the preferred direction.

15. The method of claim 11, further comprising step of automatically repetitively determining the preferred direction and selecting the panel to use for transmitting the RF signal, in response to propagation path changes that affect a signal strength of the RF signal.

16. A steerable antenna that is selectively controllable in regard to a direction in which the antenna is usable for receiving a radio frequency (RF) signal, comprising:

(a) a plurality of panels that are coupled together along edges of the panels, each panel being substantially flat and oriented so that an outwardly facing surface of the panel faces in a substantially different direction from outwardly facing surfaces of other of the plurality of panels, each panel including a plurality of discrete microstrip antennas that comprise a phased array antenna including a left panel antenna, a center panel antenna, and a right panel antenna for receiving an RF signal in a direction outwardly from the face of the panel;

(b) an omni-directional antenna configured to receive an indication from a destination device that the signal is greatest when the signal is received from a determined position;

(c) a panel selector switch circuit that is controllable in response to a selector signal to selectively activate one of the plurality of panels for receiving an RF signal, the panel selector switch circuit being coupled to an antenna terminal on each panel;

(d) a signal splitter configured to split the RF signal into separate first, second, and third instances of the RF signal; and (e) a delay selector switch circuit configured to electronically steer the focus of the phased array antenna in the direction of the strongest detected signal strength according to the indication received by the omni-directional antenna, the first instance of the RF signal being routed through a longer delay that is longer than a reference delay, the second instance of the RF signal being routed through the reference delay, the third instance of the RF signal being routed through a shorter delay that is shorter than the reference delay, each of the first, second, and third instances of the RF signal being routed simultaneously through the corresponding longer, reference, and shorter delays, respectively, such that, as a result of the different delays, each of the first, second and third instances of the RF signal is received at a different time from a different panel antenna, but each of the first, second, and third instances of the RF signal arrive at a signal processor of the steerable antenna at substantially the same time, thereby strengthening the received signal.

17. The steerable antenna of claim 16, wherein the plurality of panels are oriented substantially vertically and form an N-sided polygon, where N is equal to the number of panels in the plurality of panels.

18. The steerable antenna of claim 16, wherein the panel selector switch circuit includes a plurality of positive-intrinsic-negative (PIN) diode switches.

19. The steerable antenna of claim 16, further comprising:

(a) a plurality of delay circuits, each of which is selectively coupled to a different one of the plurality of discrete microstrip antennas; and (b) a delay switch circuit that is selectively controllable to determine which of the plurality of selective delay circuits that provide a desired delay is selected, thereby controlling a direction in which an RF signal is received by the phased array antenna on the panel.

20. The steerable antenna of claim 16, wherein each panel comprises a printed circuit board on which the discrete microstrip antennas that comprise a phased array antenna are formed as conductive traces.

21. The steerable antenna of claim 16, wherein the plurality of panels and each of the plurality of discrete microstrip antennas are sized for transmitting and receiving signals at radio frequencies used for communicating data over a wireless computing network.

* * * * *